Dec. 13, 1938.  A. L. FREEDLANDER ET AL  2,140,202

FIBER BEARING BELT CONNECTER

Filed Sept. 28, 1936

INVENTORS
ABRAHAM L. FREEDLANDER,
NORMAN J. RITZERT.
BY
ATTORNEYS

Patented Dec. 13, 1938

2,140,202

UNITED STATES PATENT OFFICE 2,140,202

FIBER BEARING BELT CONNECTER

Abraham L. Freedlander and Norman J. Ritzert, Dayton, Ohio, assignors to The Dayton Rubber Mfg. Company, Dayton, Ohio, a corporation of Ohio Application September 28, 1936, Serial No. 102,967

2 Claims. (Cl. 24—33)

This invention relates to belt connecters, and in particular, to belt connecters having parts pivotally interconnected by bearing members.

One object of this invention is to provide a belt connecter having the opposite ends of the belt interconnected by a device including a bearing member, and a bushing of fibrous material associated therewith.

Another object is to provide a belt connecter having a pair of belt clamps pivotally engaging one another by means of a bearing member, and a bushing of fibrous material, the bearing member optionally consisting of a tubular element with a tie member passing therethrough.

Another object is to provide a belt connecter having a pair of belt clamps arranged to pivotally engage one another, each belt clamp having one arm thereof broader than the other arm.

Another object is to provide a belt connecter having a pair of belt clamps with interengaging yoke portions, a fibrous bushing and a bearing member pivotally interconnecting the interengaging yoke portions.

In general, the belt connecter of this invention consists of a pair of belt clamps pivotally interconnected by a bearing member attached to one belt clamp and a bushing of fibrous material attached to the other belt clamp.

Figure 1:
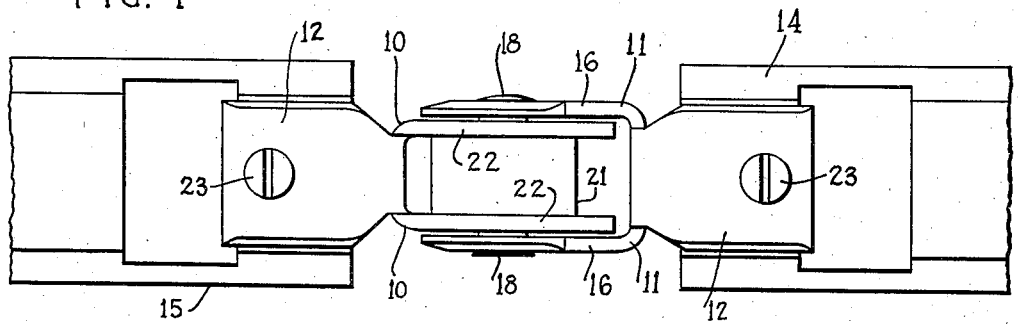
Figure 1 is a top plan view of the belt connecter of this invention.
Figure 2:
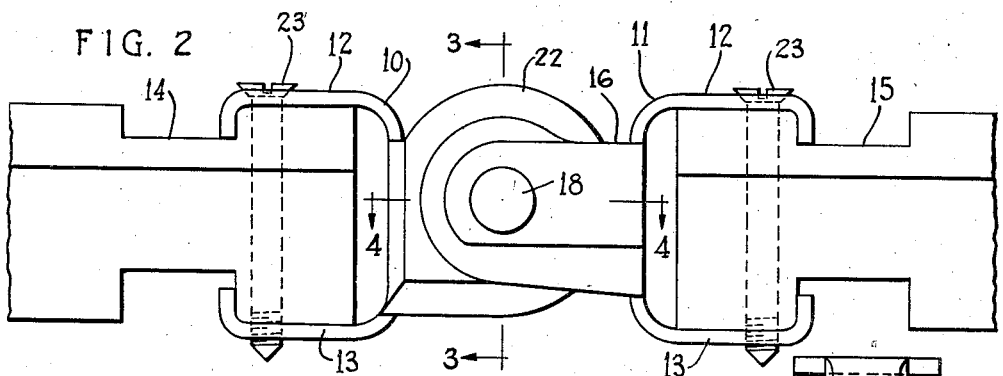
Figure 2 is a side elevation of the belt connecter shown in Figure 1.
Figure 5:
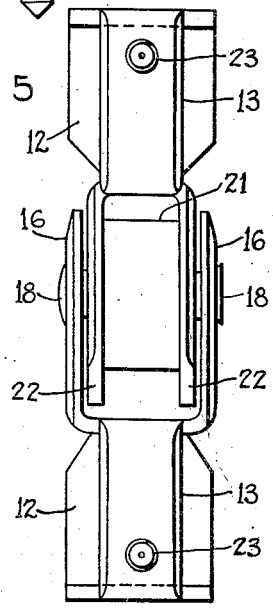
Figure 5 is a bottom plan view of the belt connecter shown in Figures 1 and 2.
Figure 3:
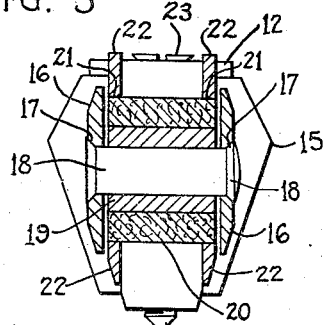
Figure 3 is a central vertical section along the line 3—3 of Figure 2, showing the internal construction of the belt connecter.
Figure 4:
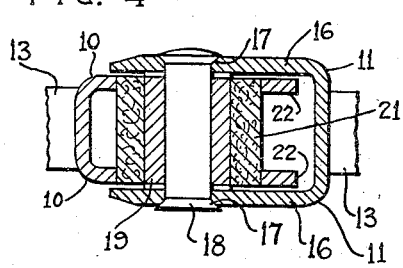
Figure 4 is a central horizontal section along the line 4—4 of Figure 2, likewise showing the internal construction of the belt connecter.

Referring to the drawing in detail, Figure 1 shows the belt connecter of this invention as consisting of belt clamps, generally designated 10 and 11, having upper and lower arms 12 and 13 interconnected through the belt ends 14 and 15 by the clamping screws 23. The upper belt connecter arms 12 are broader than the lower arms 13. The belt clamp 11 is provided with inwardly directed arms 16 having holes 17 therein adapted to receive a tie member 18, such as a rivet or similar element. Surrounding the tie member 18 is a bearing member 19, in the form of a bushing of hardened steel or similar bearing material, preferably stainless steel. Surrounding the bearing member 19 is a bushing 20 of fibrous material, the outer surface of which is secured within the holes 21 in the forward directed arms 22 of the belt clamp 10. The belt with which the belt connecter of this invention can be used may be of any suitable type, a belt of hexagonal cross section being shown.

In the assembly of the belt connecter of this invention the belt clamps 10 and 11 are placed in juxtaposition, with the arms 22 of the former extending within the arms 16 of the latter, and with the fibrous bushing 20 and bearing member 19 in place within the holes 21 in the arms 22. The tie member 18 is then inserted through the holes 17 and the ends thereof upset, in a manner to prevent the removal thereof and to tie the assembly securely together.

In the operation of the belt connecter shown in Figures 1 to 5, the belt in traveling around the pulleys which it interconnects, causes the belt clamps 10 and 11 to flex relatively to one another around the axis of the bearing element 19 as a pivot. When this occurs the outer surface of the bearing element engages the inner surface of the fibrous bushing 20 so that the thrust between the opposite ends 14 and 15 of the belt is thereby sustained.

It will be understood that we desire to comprehend within our invention such modifications as come within the scope of the claims and the invention.

Having thus fully described our invention, what we claim as new and desire to secure by Letters Patent, is:

1. In combination in a belt connecter, a pair of belt clamps, one of said clamps having inwardly directed arms provided with aligning holes to receive a tie member, the other of said clamps provided with inwardly directed arms located parallel with the first mentioned arms and having aligning holes of larger diameter than the holes in said first mentioned arms, a tie member in the holes of said first mentioned arms and interconnecting said arms, a tubular bearing element of harder material than said tie member surrounding the latter, and a bushing of relatively softer material surrounding said bearing element, said bearing element and bushing being located in the holes of said second mentioned arms whereby a durable bearing is effected between the bearing element and bushing and a cushioning action effected between the members of said connecter.

2. A belt connecter comprising upper and lower arms and means interconnecting said arms with the belt ends, a pair of inwardly directed arms connected with one pair of said first mentioned arms having aligned holes therein, a tie member in said holes connecting said arms, a pair of inwardly directed arms connected with the other pair of tie member arms and provided with aligned holes of larger diameter than the holes which receive said tie member, a bearing bushing of relatively hardened material surrounding said tie member, and a bushing of relatively softer material surrounding said bearing bushing, said bushings occupying the enlarged holes of the last mentioned pair of arms and providing durable bearing means and a yielding thrust receiving element between the members of the belt connecter.

ABRAHAM L. FREEDLANDER.
NORMAN J. RITZERT.